United States Patent
Raviv et al.

(10) Patent No.: US 10,061,909 B2
(45) Date of Patent: Aug. 28, 2018

(54) DEVICE AUTHENTICATION BASED ON BEHAVIOR CLASSIFICATION USING CONVOLUTION NEURAL NETWORK

(71) Applicant: QUALCOMM Incorporated, San Diego, CA (US)

(72) Inventors: Dolev Raviv, Kiryat-Yam (IL); Lee Susman, Pardesia (IL); Ofer Rosenberg, Ramot Menashe (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/394,551

(22) Filed: Dec. 29, 2016

(65) Prior Publication Data

US 2018/0189466 A1      Jul. 5, 2018

(51) Int. Cl.
*G06F 21/31* (2013.01)
*G06N 3/08* (2006.01)

(52) U.S. Cl.
CPC .......... *G06F 21/316* (2013.01); *G06N 3/08* (2013.01)

(58) Field of Classification Search
CPC ............................... G06F 21/316; G06N 3/08
See application file for complete search history.

(56) References Cited

U.S. PATENT DOCUMENTS

| | | | | |
|---|---|---|---|---|
| 9,330,257 B2* | 5/2016 | Valencia | ............... | G06F 21/552 |
| 9,955,319 B2* | 4/2018 | Matus | ..................... | H04W 4/40 |
| 2002/0034319 A1* | 3/2002 | Tumey | ............... | G06K 9/00087 |
| | | | | 382/116 |
| 2013/0347100 A1* | 12/2013 | Tsukamoto | ........... | H04L 9/3226 |
| | | | | 726/19 |
| 2014/0025973 A1* | 1/2014 | Schillings | ................ | H04Q 9/00 |
| | | | | 713/323 |
| 2014/0300554 A1* | 10/2014 | Samuel | .................... | G06F 21/32 |
| | | | | 345/173 |
| 2015/0066822 A1* | 3/2015 | Li | ........................ | G06N 99/005 |
| | | | | 706/12 |
| 2015/0161587 A1* | 6/2015 | Khan | ................. | G06Q 20/3223 |
| | | | | 705/44 |
| 2015/0213244 A1* | 7/2015 | Lymberopoulos | ...... | G06F 21/32 |
| | | | | 726/18 |
| 2015/0356286 A1* | 12/2015 | Quirk | ...................... | G06F 21/32 |
| | | | | 726/19 |
| 2015/0379253 A1* | 12/2015 | Cook | ...................... | G06F 21/32 |
| | | | | 726/19 |

(Continued)

OTHER PUBLICATIONS

Frank M., et al., "Touchalytics: On the Applicability of Touchscreen Input as a Behavioral Biometric for Continuous Authentication," IEEE Transactions on Information Forensics and Security, vol. 8 (1), Jan. 2013, pp. 136-148.

(Continued)

*Primary Examiner* — Nelson Giddins
(74) *Attorney, Agent, or Firm* — Seyfarth Shaw LLP

(57) ABSTRACT

A method of authenticating a user on a mobile device includes gathering samples of behavioral data of the user from multiple sensors of the mobile device, each sensor generating a different number of samples. The method also includes normalizing the samples to have a same number of samples for each sensor. The method further includes extracting, with a convolutional neural network, features from the normalized samples and authenticating the user based on the extracted features.

15 Claims, 7 Drawing Sheets

(56) References Cited

U.S. PATENT DOCUMENTS

| | | | |
|---|---|---|---|
| 2016/0034809 A1* | 2/2016 | Trenholm | H04L 41/5041 706/20 |
| 2016/0078210 A1* | 3/2016 | Lymberopoulos | G06F 21/32 726/18 |
| 2016/0093182 A1* | 3/2016 | Turgeon | G08B 13/2402 340/572.1 |
| 2016/0171192 A1* | 6/2016 | Holz | G06F 21/31 726/19 |
| 2016/0231830 A1* | 8/2016 | Nemala | G06F 3/038 |
| 2016/0241554 A1* | 8/2016 | Zizi | H04L 63/0861 |
| 2017/0111359 A1* | 4/2017 | Zizi | H04L 63/0876 |
| 2017/0147803 A1* | 5/2017 | Zizi | G06F 21/32 |
| 2017/0193335 A1* | 7/2017 | Montoro | G06N 3/08 |
| 2017/0213145 A1* | 7/2017 | Pathak | G06N 99/005 |
| 2017/0236407 A1* | 8/2017 | Rhoads | G08C 17/02 455/420 |
| 2017/0270289 A1* | 9/2017 | Lymberopoulos | G06F 21/32 |
| 2017/0293815 A1* | 10/2017 | Cosatto | G06K 9/00201 |
| 2018/0053108 A1* | 2/2018 | Olabiyi | G06N 99/005 |
| 2018/0077538 A1* | 3/2018 | Matus | H04W 4/046 |

OTHER PUBLICATIONS

Jain A., et., al., "Exploring Orientation and Accelerometer Sensor Data for Personal Authentication in Smartphones Using Touch-screen Gestures", Pattern Recognition Letters, vol. 68, 2015, pp. 351-360.

* cited by examiner

DEVICE AUTHENTICATION BASED ON BEHAVIOR CLASSIFICATION USING CONVOLUTION NEURAL NETWORK

BACKGROUND

Field

Certain aspects of the present disclosure generally relate to machine learning and, more particularly, to improving systems and methods of authenticating a user of a device, such as a mobile device, based on the user's behavior.

Background

Generally, a device is authenticated using a password. In some cases, biometric data, such as a fingerprint or retinal scan, may be used to authenticate a device. In other cases, behavioral data may be used to authenticate a device.

Behavioral data may include one or more samples from different sensors on a mobile device, such as a touch sensor, accelerometer, and/or gyroscope. The samples from the different sensors arrive at different rates and have different lengths (e.g., sizes). A sample refers to data collected from a sensor. Furthermore, each sensor may generate a different number of samples. The number of samples may depend on the captured time span and sampling frequency. In conventional systems, a sampling mechanism may generate raw unaligned data with different lengths.

Additionally, in conventional systems, domain knowledge is used to extract features from the behavior data. A machine learning component may predict the user based on the extracted features. Typically, the machine learning component is a convolutional neural network (CNN) that learns connections between consecutives samples to predict the user based on the extracted features.

A convolutional neural network refers to a type of feed-forward artificial neural network. An artificial neural network with an interconnected group of artificial neurons (e.g., neuron models) may be a computational device or may be a method to be performed by a computational device. Convolutional neural networks may include collections of neurons, each neuron having a receptive field and also collectively tiling an input space. Finally, convolutional neural networks may be used for pattern recognition and/or input classification.

As discussed above, in conventional systems, features are extracted using domain knowledge. That is, a user defines which features to extract from the samples. Thus, conventional systems are less accurate and rely on the quality of work of the domain expert. Furthermore, conventional systems use unaligned samples that are not compatible with machine learning architecture.

SUMMARY

In one aspect of the present disclosure, a method of authenticating a user on a mobile device is disclosed. The method includes gathering samples of behavioral data of the user from multiple sensors of the mobile device. Each sensor generates a different number of samples during a period of time. The method also includes normalizing the samples to have a same number of samples for each sensor during the period of time. The method further includes extracting, with a convolutional neural network, features from the normalized samples. The method still further includes authenticating the user based on the extracted features.

Another aspect of the present disclosure is directed to an apparatus including means for gathering samples of behavioral data of the user from multiple sensors of the mobile device. Each sensor generates a different number of samples during a period of time. The apparatus also includes means for normalizing the samples to have a same number of samples for each sensor during the period of time. The apparatus further includes means for extracting, with a convolutional neural network, features from the normalized samples. The apparatus still further includes means for authenticating the user based on the extracted features.

In another aspect of the present disclosure, a non-transitory computer-readable medium with non-transitory program code recorded thereon is disclosed. The program code for authenticating a user on a mobile device is executed by at least one processor and includes program code to gather samples of behavioral data of the user from multiple sensors of the mobile device. Each sensor generates a different number of samples during a period of time. The program code also includes program code to normalize the samples to have a same number of samples for each sensor during the period of time. The program code further includes program code to extract, with a convolutional neural network, features from the normalized samples. The program code still further includes program code to authenticate the user based on the extracted features.

Another aspect of the present disclosure is directed to an apparatus for authenticating a user on a mobile device having a memory unit and one or more processors coupled to the memory unit. The processor(s) is configured to gather samples of behavioral data of the user from multiple sensors of the mobile device. Each sensor generates a different number of samples during a period of time. The processor(s) is also configured to normalize the samples to have a same number of samples for each sensor during the period of time. The processor(s) is further configured to extract, with a convolutional neural network, features from the normalized samples. The processor(s) is still further configured to authenticate the user based on the extracted features.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
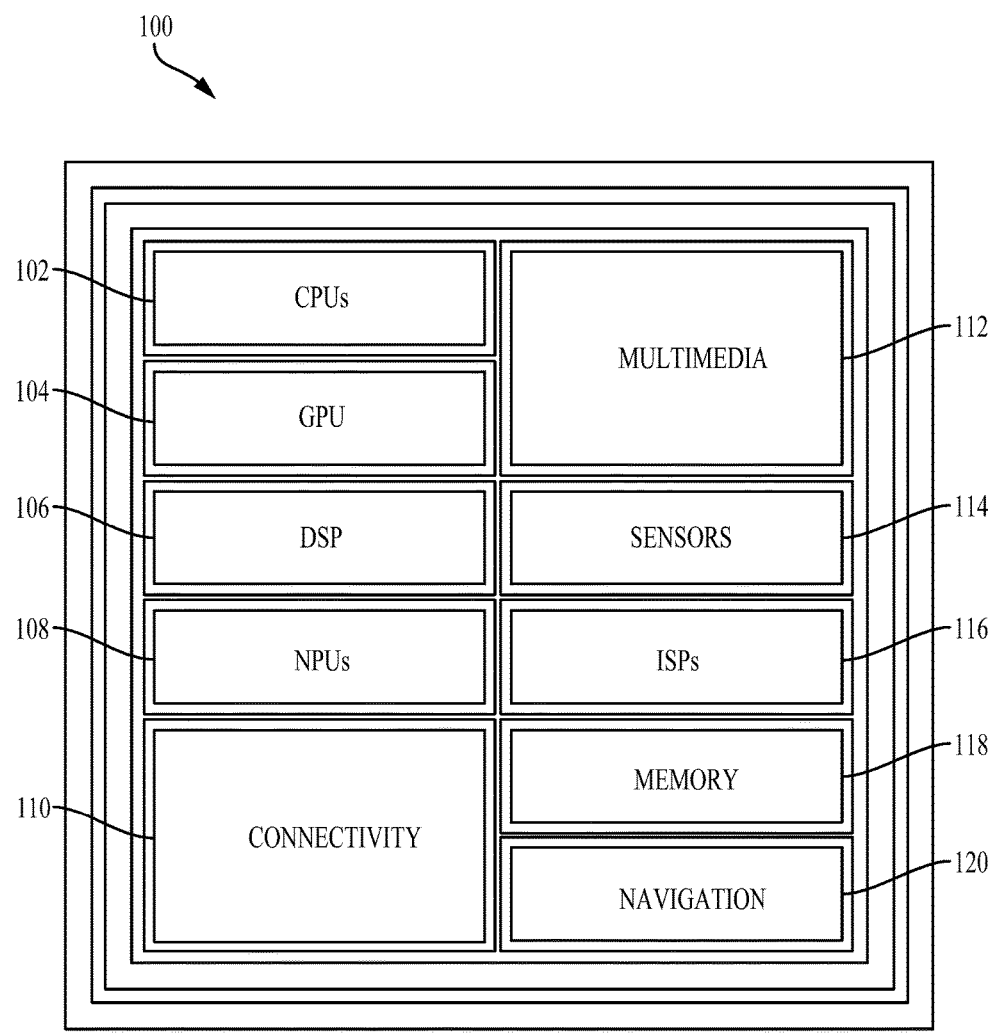
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

For security, as well as other reasons, it is desirable to authenticate a user of a mobile device. Authentication may be used to unlock the mobile device. Furthermore, while the device is unlocked, the mobile device may also authenticate the user to maintain the unlocked state and/or to provide access to various applications. For example, during operation, the mobile device may authenticate the current user to allow continued access to applications designated for the current user. If a user is not authenticated, access to one or more applications may be denied. Additionally, while a device is unlocked, the operator may change from a first user to a second user. In one configuration, based on the behavioral data, the mobile device determines that the operator has changed from the first user to the second user. In response to the detected operator change, the mobile device adjusts the access according to the account (e.g., device) permissions granted to the second user.

The behavioral data may be gathered from multiple sensors and the gathering of behavioral data may be implicit to the user. That is, an explicit user response is not compelled during the authentication process. Rather, the authentication is seamlessly performed during the user's typical use of the device. For example, the behavioral data collection may include the force of a touch on a touch screen, the length of the touch, the orientation of the phone, the time of use, and/or currently running applications. The seamless authentication decision may be based on the union of all sensor inputs, including the correlations between different behavioral components.

FIG. 1 illustrates an example implementation of the aforementioned authentication using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation 120, which may include a global positioning system.

The SOC 100 may be based on an ARM instruction set. In an aspect of the present disclosure, the instructions loaded into the general-purpose processor 102 may comprise code to gathering samples of behavioral data of the user from multiple sensors of the mobile device. The instructions loaded into the general-purpose processor 102 may also comprise code to normalizing the samples to have a same number of samples for each sensor. The instructions loaded into the general-purpose processor 102 may further comprise code to extract, with a convolutional neural network, features from the normalized samples. The instructions loaded into the general-purpose processor 102 may further comprise code to authenticating the user based on the extracted features.

Figure 2:
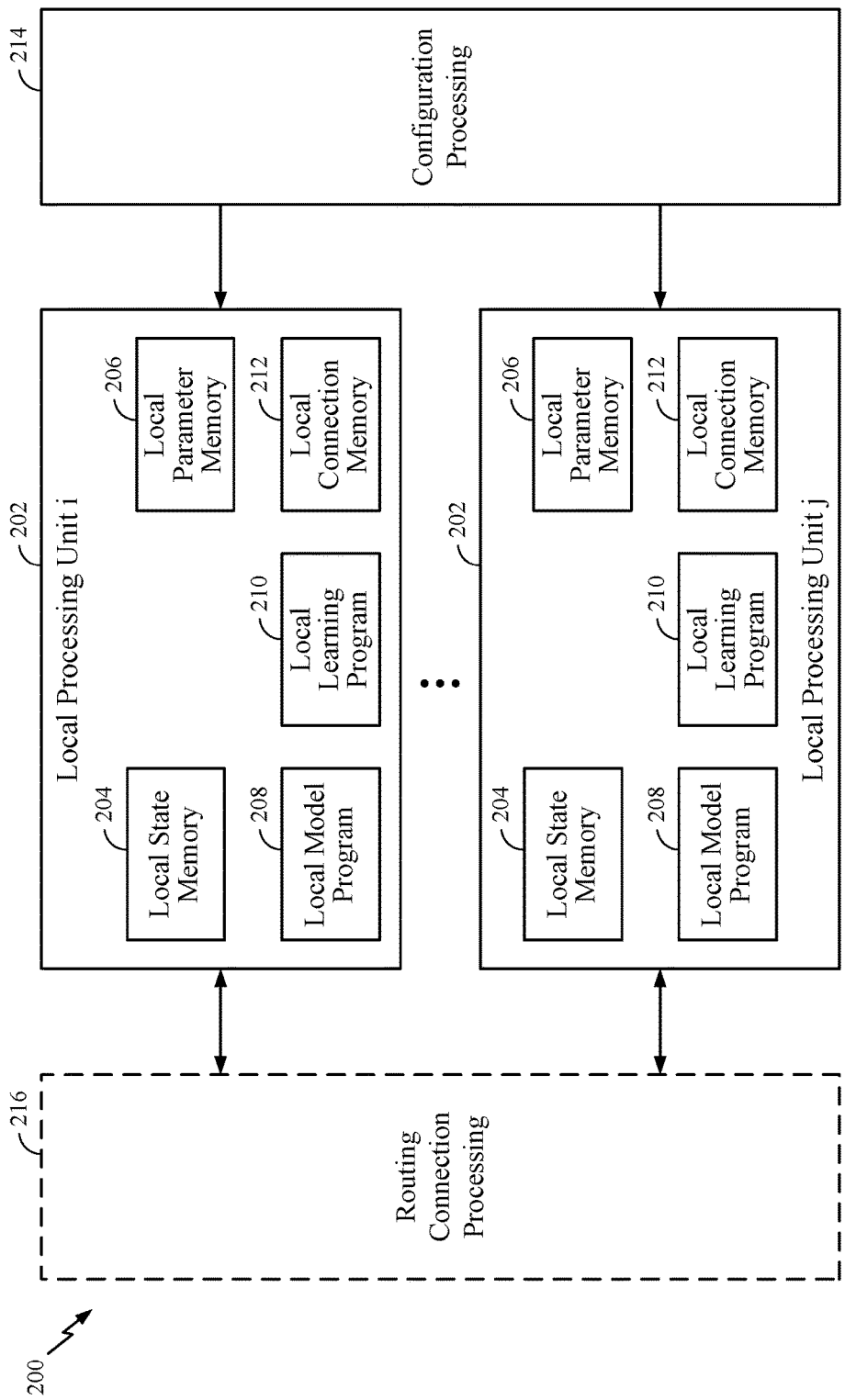
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

In one configuration, a processing model is configured for gathering samples of behavioral data of the user from multiple sensors of the mobile device, normalizing the samples to have a same number of samples for each sensor, extracting, with a convolutional neural network, features from the normalized samples, and authenticating the user based on the extracted features. The model includes generating means, normalizing means, modifying means, and/or authenticating means. In one configuration, the generating means, normalizing means, modifying means, and/or authenticating means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
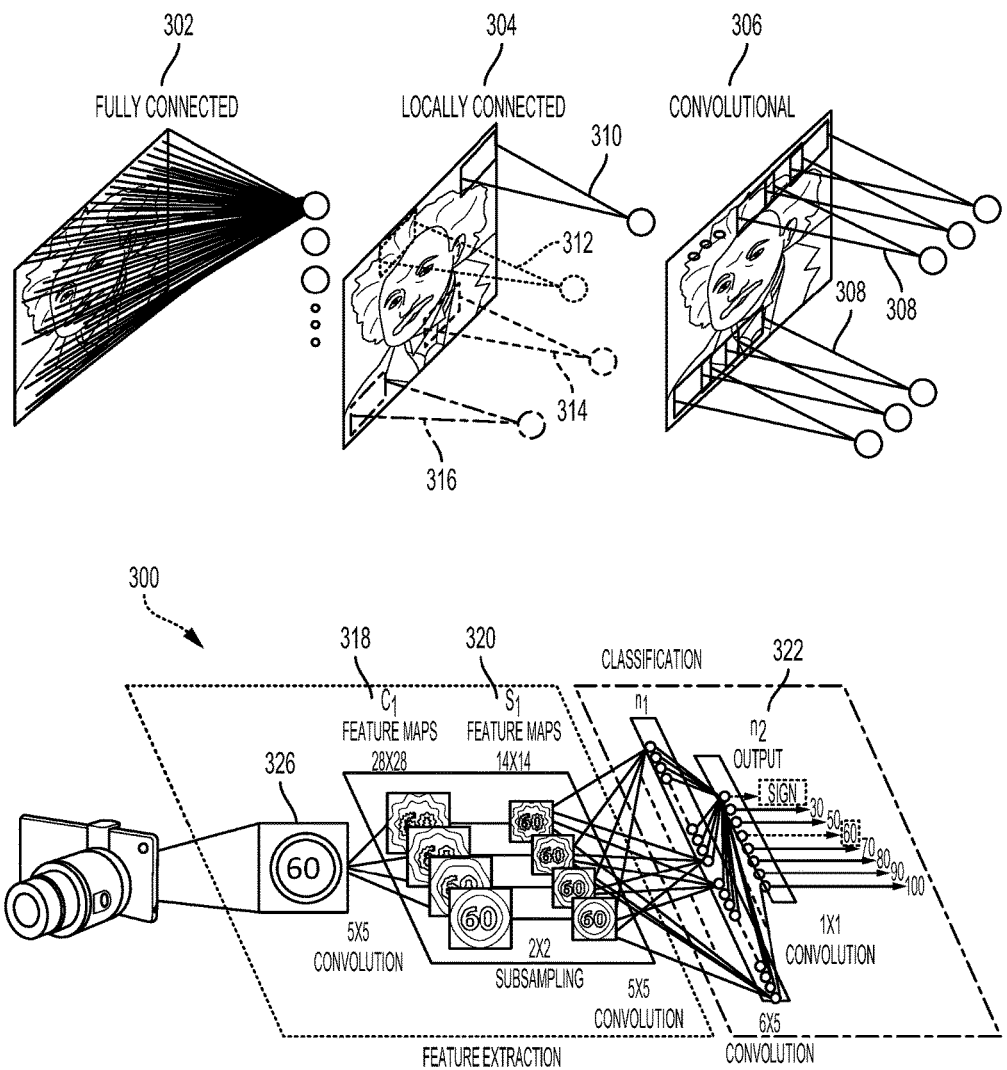
FIG. 3A is a diagram illustrating a neural network.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with a signal, such as a cropped image of a speed limit sign 326, and a "forward pass" may then be computed to produce an output 322. The signal may include one-dimensional behavior samples. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template, a temporally invariant template, or a basis projection. The input may be decomposed into multiple channels. For example, each channel may represent a color, such as the red, green, and blue channels of a color image. As another example, each channel may include a sample from a sensor, such as a touch sensor, global positioning system (GPS) sensor, rotation sensor, and/or pressure sensor. A convolutional network trained on a color input may be considered three-dimensional, with two spatial dimensions along the axes of the image and a third dimension capturing color information. When receiving a sample from a sensor, such as a touch sensor, the convolutional network trained on that input may be considered temporal. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

FIG. 3A illustrates an example of a two-dimensional (2D) convolutional neural network. Aspects of the present disclosure are not limited to the 2D convolutional neural network of FIG. 3A as other types of convolutional neural networks, such as a one-dimensional convolutional neural network, are also contemplated. Moreover, although a single sensor (e.g., camera) is shown, each of multiple sensors may input into a one-dimensional convolutional neural network, as discussed in more detail below.

Figure 3B:
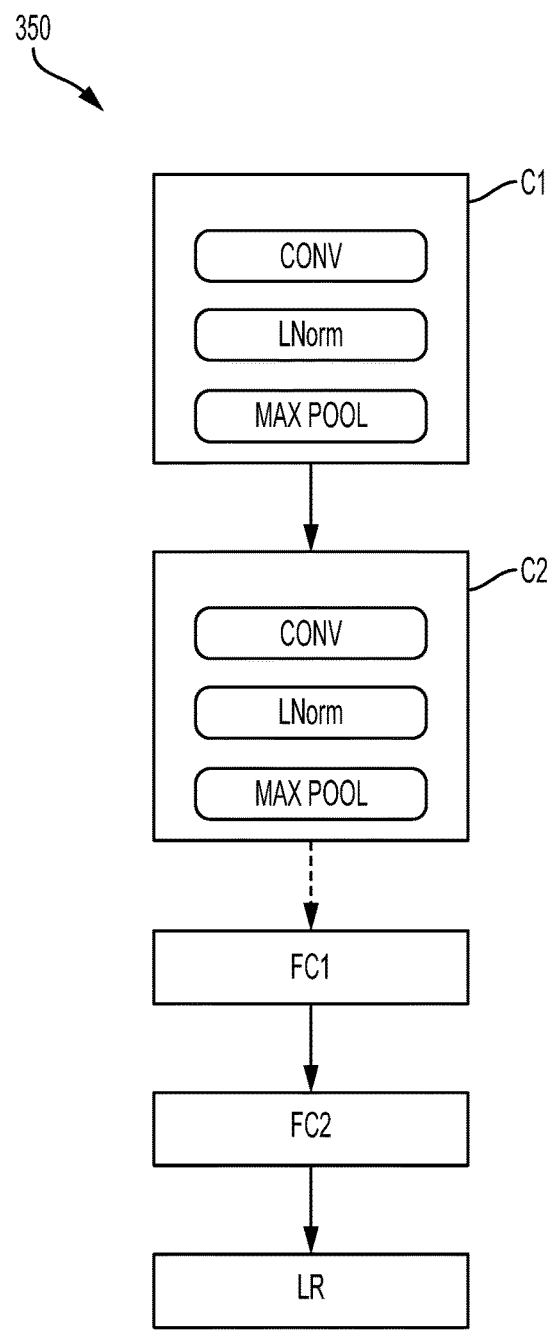
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolution blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. The deep convolutional network 350 may also use batch normalization layers, shortcuts between layers, and splits in a network graph. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
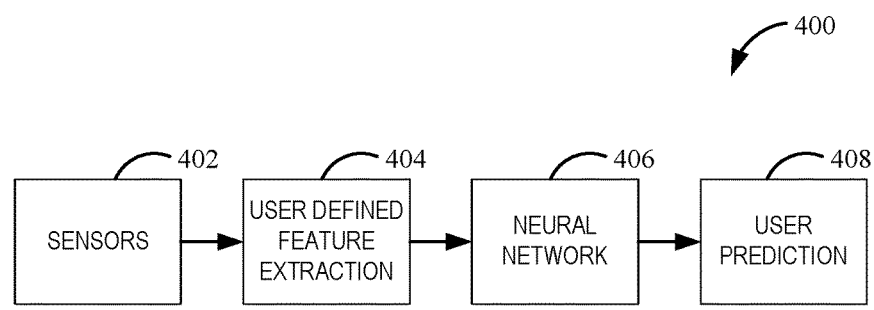
FIG. 4 is a diagram illustrating a conventional user authentication process.

FIG. 4 illustrates an example of a conventional authentication process 400. As shown in FIG. 4, at block 402, multiple sensors of a device may implicitly collect samples of a user's behavioral data. After the samples are collected from the multiple sensors, domain knowledge feature extraction is performed on the collected samples (block 404). Domain knowledge feature extraction refers to extracting features defined by a third party (e.g., domain expert), or a user. For example, the features defined for extraction may be touch length, touch pressure, and running background applications. At block 406, the extracted features are input to a machine learning component, such as an artificial neural network. Using the extracted features, the machine learning component may predict the user (block 408).

In conventional systems, such as a computer system without a real-time operating system, a signal sample rate may not be uniform. Thus, different signals may have different sampling frequencies. When recorded, each signal has a different number of samples at different points of time. For machine learning, it is desirable for the signals to have the same amount of samples at the same timestamps.

Sequential Data Analysis with Convolutional Neural Networks

Aspects of the present disclosure are directed to improving the authentication of a user based on the user's regular interaction with a device. The behavioral data may be implicitly collected from multiple sensors. For example, the behavioral data collects the force of a touch on a touch screen, the length of the touch, the orientation of the phone, the time of use, and/or currently running applications, including background applications. In one configuration, an authentication decision is based on the fusion of all sensor inputs, including the correlations between different behavioral components.

Classification may be performed by a feed-forward neural network, which is trained with a user's behavioral data samples as well as a consortium of sample behavioral data from other users. The classification network is augmented by a number of feature extraction layers (e.g. via one-dimensional convolution along time in each sample). Thus, aspects of the present disclosure define one multichannel feature vector, for the multiple samples, to input to the classifier. The classifier may receive a vector or a matrix.

In one configuration, a device is provided with a pre-trained feature extractor. The features of the pre-trained feature extractor are learned from a consortium of sample behavioral data from multiple users. Additionally, during a training phase, the behavioral data of a user of the device is used to fine-tune the feature extraction. For example, normalized samples from a user are used by a convolutional neural network of the mobile device to fine-tune (e.g., adjust) the feature learning according to behavioral data of the user.

As a result of the fine-tuning, the feature extractor extracts the defined features based on the user's behavior. The extracted features are used for authentication by a classifier. The classifier may be trained based on the user data as well as a consortium of sample behavioral data from multiple users of different devices. The user data may be positive samples and the consortium of data may be negative samples. The training may use a one-to-one ratio of positive and negative samples (e.g., one positive sample for each negative sample). Alternatively, other ratios of positive to negative samples are contemplated.

As an example, for authentication for a first device, the time of touch, background applications, and orientation are extracted features used for authentication. Furthermore, in this example, for authentication of a second device, the strength of the touch, phone location, and phone orientation are extracted features used for authentication. In one configuration, the feature extractor is fine-tuned based on the learning performed for each device.

According to an aspect of the present disclosure, the initial training is performed remotely, such as on the cloud or on a server. The initial training trains an initial model for a specific device type that includes a set of sensors that generate behavioral data. In this configuration, the trained initial model is further fine-tuned to a specific user on the target device. The remote training may not be applied to a different device type as the difference in the sensor array is too large, and the deviation in the model will exceed a deviation threshold. According to aspects of the present disclosure, each device is trained on its own initial model, which can later be fine-tuned to a specific user.

Behavioral data corresponds to information, such as a user gesture, obtained via a sensor on the mobile device. The behavioral data may comprise a sequence of samples from multiple sensors. Each sensor may be sampled independently in multiple different time intervals, resulting in a multichannel time series. The sequence of samples may be referred to as a sequence of multi-dimensional time based samples (one dimension for each sensor). Time based samples refer to samples received from the sensor at a given time. In one configuration, the sensors are synced on a common system clock, which provides all sensors with the same time base. In addition, the sensors may be able to measure the passing of time to a pre-determined resolution, such as microseconds.

Each sensor provides data at its own rate, which may be different from the rate of other sensors. Therefore, each sensor generates a different number of samples at different times. Additionally, for each generated sample, the sensor provides the measure of time when it was taken (e.g., timestamp). The timestamp may also be used as a channel to the network.

The input size of a neural network, such as a convolutional neural network or a deep neural network, is fixed. Thus, in order to evaluate new samples (e.g., unseen samples), for authentication and/or training, inputs to the neural network are normalized to a fixed length and/or frequency (e.g., sampling rate). Still, normalizing the samples may cause the loss of some behavioral information. Therefore, it is desirable to normalize the samples while preserving behavioral information to maintain the accuracy of the authentication and/or training. In one configuration, the samples are vectors (e.g., tensors) that are adjusted to a pre-determined size and/or frequency. Normalizing the samples may result in a network with a reduced size. The reduced size may also result in a reduced amount of weights and a reduced volume of data passed between layers. Aspects of the present disclosure reduce the resources used during user authentication. The reduced resources may allow the authentication to be performed on a device with limited resources, such as a mobile device.

In one configuration, the fixed size and/or frequency is estimated based on statistics of behavioral data pooled from multiple users. The multiple users are users of different devices and/or users of the same device. By calculating the distribution (e.g., distribution of the number of samples) of gesture lengths and/or gesture frequency, the length and/or frequency is/are selected to reduce data loss. Furthermore, in one configuration, the fixed size and/or frequency is/are also determined based on the resources available on a mobile device. That is, a mobile device may have limited memory and/or processing capacity, therefore, the neural network may be limited in the size and/or number of the samples that can be processed.

Behavioral data with a samples size that is less than the fixed number of samples, or within a size range (e.g., less than a first threshold and greater than a second threshold), may be compensated by interpolation and extrapolation. Furthermore, gestures having a length (e.g., number of samples) that is greater than the fixed size may be sub-sampled or discarded. In one configuration, the value of the sample size is adjusted based on re-calculating gesture length statistics of a user.

As an example, behavioral data may be received from a touchscreen sensor. In this example, two components of a feature vector from the touchscreen sensor are Cartesian coordinates (e.g., x, y) of the location of the touch on the touchscreen. The coordinates of a user's touch may be plotted over time to determine a gesture that was received on the touchscreen. In some cases, the time period of a gesture may be greater than a threshold, such as a time threshold. In this example, the received gesture may be longer than the threshold, e.g., two seconds. A touchscreen gesture having a sample size that is greater than the threshold may be indicative of a doodle rather than an application specific gesture, such as a gesture for unlocking the device or accessing an application. Thus, a gesture with a time period that is greater than a threshold may not be an accurate representation of a behavioral sample (e.g., user statistic). Therefore, the samples associated with the gesture may be discarded or sub-sampled.

As another example, a background application sensor may provide information of applications running in the background. In most cases, a background application may be running until the application is force closed by the user. That is, even if the user exits the application, the application may still be running in the background. Therefore, the samples provided by the background application may be greater than a threshold, such as a size threshold. Still, although the sample size is greater than a threshold, the large sample size may not be indicative of an inaccurate representation. Rather, in this example, because the information of the background application is constant, the sample size may be sub-sampled to the pre-determined sample size. In one configuration, the decision to discard a sample or sub-sample a sample when the sample exceeds a size threshold is based on the type of sample and/or consistency of the sample received from a sensor.

In yet another example, a gesture may be within a specific range (e.g., less than a first threshold and greater than a second threshold). For example, the user may perform a quick tap on the touchscreen such that there are a limited number of time points, such as two samples received at two different times. In this example, the fixed sample size for inputting samples to the convolutional neural network may be thirty samples. In one configuration, the gesture having a number of samples that is less than a threshold is interpolated to estimate the remaining samples, such that the number of samples of the gesture (e.g., two) is equal to the fixed sample size (e.g., thirty).

As previously discussed, a number of samples at a given time point may be different for each sensor. That is, each behavior signal output from a sensor has a different number of samples, depending on the captured time span and sensor sampling frequency. In one configuration, the samples are interpolated to generate the same number of samples at a given timestamp. The interpolation estimates a mathematical formulation of a behavior signal that is output from a sensor based on the samples of the behavioral signal. The interpolation may be independently performed for each behavioral signal. After each signal is interpolated to have the same number of samples at the same time point, each interpolated signal is sampled using the same starting point, frequency, and number of samples. The sampling of the interpolated signals results in an ideal sampling where the same number of samples having the same length and frequency are input to the neural network.

In one configuration, the interpolation occurs in two stages. In the first stage, using the initial samples, the interpolation estimates a function used for drawing the initial samples. In the second stage, the estimated function is used to draw a new sample having a length that is equal to the pre-determined fixed size.

Figure 5:
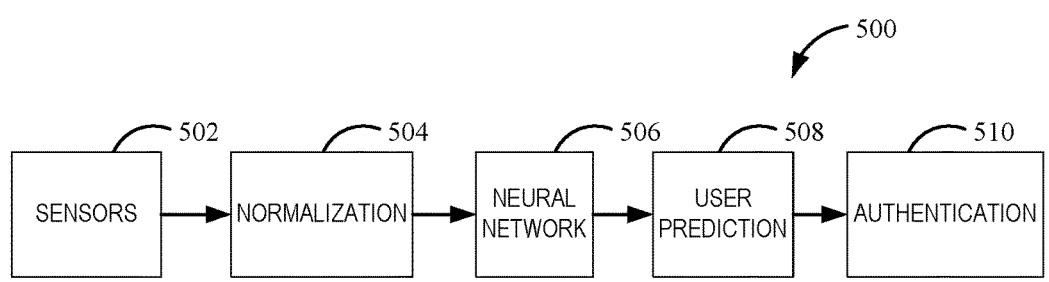
FIG. 5 is a diagram illustrating a user authentication process in accordance with aspects of the present disclosure.

FIG. 5 illustrates an example of an authentication process 500 according to an aspect of the present disclosure. As shown in FIG. 5, at block 502 multiple sensors implicitly collect samples of behavioral data from a user. As previously discussed, the samples may include the force of a touch on a touch screen, the length of the touch, the orientation of the phone, the time of use, and/or running applications (including background applications). Of course, the samples are not limited to the samples discussed above. Other types of samples of behavioral data are contemplated by the present disclosure. Furthermore, aspects of the present disclosure are not limited to the aforementioned sensors, as other sensors are also contemplated. In one configuration, the samples are collected at pre-determined intervals for each sensor. The pre-determined intervals may only collect information while the user is interacting with the device. Additionally, or alternatively, the samples may be collected when there is no user interaction, such as when a mobile device is in a user's pocket. For example, the sensors may collect multiple samples, such as three samples per second, while the user is interacting with the device.

Interaction with the device may refer to actions that have a beginning and an end. For example, an interaction may include the beginning and end of a touch action of the device. As another example, the interaction may include the motion of pulling a device out of the user's pocket.

After the samples are collected from the multiple sensors, the samples are normalized at block 504. In one configuration, a different number of samples (e.g., vectors) are received from different sensors. The samples may also have different lengths. In conventional systems, one sensor may be specified for authentication. Therefore, the samples of conventional systems may not have a size disparity. Additionally, or alternatively, conventional systems may perform the feature extraction, classification, and/or authentication offline, at a remote server with more resources than a mobile device. Therefore, conventional systems may not normalize due to the availability of additional resources and/or the consistent sizes of samples. The normalization may be referred to as data parsing.

As previously discussed, behavioral signals may be interpolated from generated samples to produce the same number of samples for each signal. Furthermore, the interpolated signal may be normalized by sampling each interpolated signal with the same starting point, frequency, and number of samples. The sampling may also sample the same length from each interpolated signal. The interpolation may be referred to as sample alignment.

The frequency and/or length of the sampling may be determined from a statistical analysis of behavioral data of various users. That is, in one configuration, the sampling function for sampling the interpolated signal is determined based on the statistics of behavioral data pooled from multiple users. The behavioral data pooled from the multiple users may also be used as training data for the neural network. By calculating the distribution of gesture lengths (e.g., distribution of the number of time-samples), the length and/or frequency for the samples is selected to reduce data that may be lost due to normalization. Furthermore, the length and/or frequency is also selected to obtain accurate samples for classification. That is, if a sample is too short, the results of the classification may be inaccurate. Additionally, different sensors may be sampled at different times (e.g., frequency). The sampling frequency may also vary.

Once the samples are normalized to a pre-determined length, the samples are input to a neural network 506 for feature extraction and classification. The neural network may be a convolutional neural network, such as a deep convolutional network (DCN). The features may be extracted from the samples based on training data. The training data may be acquired from a pool of different users. Furthermore, the training data may be fine-tuned for the specific device by also using data from one or more users of the specific device. The extracted features are used to classify the user. Thus, at block 508, the device predicts the user based on the extracted features. Furthermore, at block 510, the device authenticates the user based on the predicted user.

In one configuration, an authentication procedure receives a sequence of predictions and processes the received predictions to increase the level of confidence. For example, the authentication procedure processes the sequence of predictions by using a sliding averaging window to average the last N predictions to smooth the decision. The output of the processing of the sequence of predictions is compared to a threshold. The user is authenticated when the output is greater than a threshold. Additionally, the neural network may predict a result with a confidence level based on statistics, such as nearest neighbor (NN), or machine learning. In the authentication stage, the confidence level is accumulated with previous confidence levels to generate a global time robust confidence level.

The authentication may be used to unlock a device, allow continued device use, and/or allow access to various applications. For example, the authentication may allow continued access to one or more features of a device. Additionally, as an example, if a user is authenticated as a child (e.g., restricted user), certain features may be restricted. In another example, the device may support multiple accounts, such as multiple mail accounts and/or multiple social media accounts. The authenticated user is granted access to one of the multiple accounts associated with the user. Accordingly, various applications and/or settings may be enabled and/or disabled based on the authentication. In another configuration, if the authentication fails, the user may be locked out of the device until the user is re-authorized.

Figure 6:
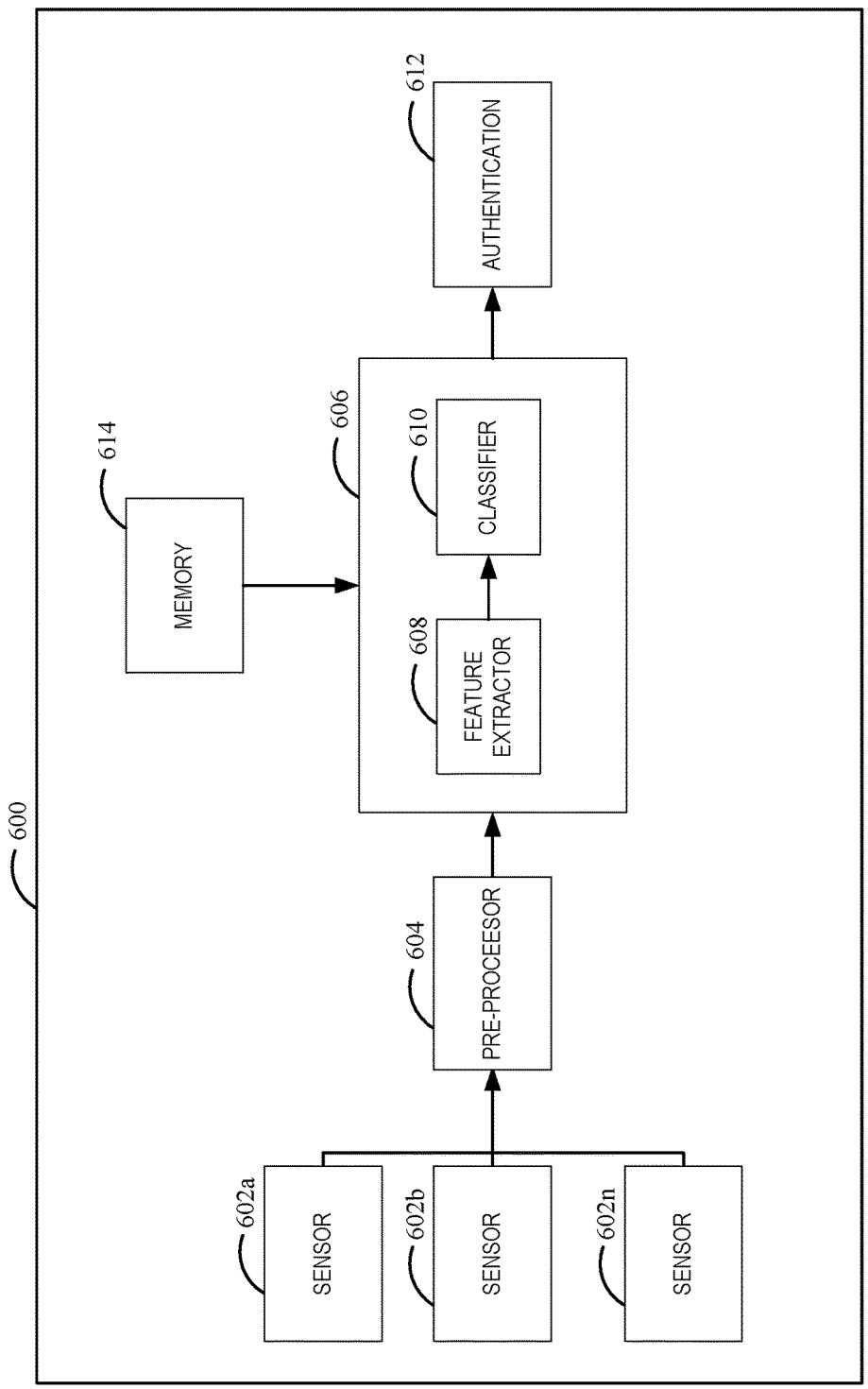
FIG. 6 is a diagram illustrating modules of a mobile device for user authentication in accordance with aspects of the present disclosure.

FIG. 6 illustrates examples of modules of a mobile device 600 used to authenticate a user based on behavioral data. As shown in FIG. 6, the mobile device 600 includes multiple sensors 602a-602n. As previously discussed, the sensors may include a touchscreen sensor, a background application sensor, a gyroscope, an accelerometer, and/or any other type of sensor used to collect user information and/or gestures. A sensor may produce a variant of a signal. For example, a gyroscope sensor has three directions, and a touch sensor may include (x,y) coordinates as well as pressure coordinates. Post calculations on a sensor signal may produce additional signals. For example, the touch screen may produce finger orientation, the accelerometer may produce a free fall alert signal, and/or the aggregation of the accelerometer and gyroscope may produce an activity signal. The activity signal may indicate an activity such as sitting, walking, running, or standing. The post calculations may be performed by a component and/or software that manages the sensors. Thus, the signals from the sensors include the signals generated from the sensor as well as variants of the signal, such as post-calculation signals.

Furthermore, the sensors may transmit one or more samples to a pre-processing module 604. Each sample may have a different size (e.g., length). The different sizes may be based on the number of time steps of each sample. For example, for a sample generated from a touch sensor, a sample may have a small size if the user performed a quick swiping gesture on the touchscreen. Additionally, the sample generated from the touch sensor may have a large size if the user used the touchscreen to draw a picture.

In one configuration, the pre-processing module 604 normalizes the samples to a pre-determined length (e.g., size) using interpolation or sub-sampling. That is, samples that have a size that is less than the pre-determined length may be interpolated to increase the size to the pre-determined length. Furthermore, samples that have a size that is greater than the pre-determined length may be discarded or sub-sampled to be equal to the pre-determined length. As previously discussed, the samples are used by a neural network to fine-tune the feature extraction and the classification. The artificial neural network may not operate efficiently (or at all) with samples of different lengths. Therefore, to authenticate a user, based on the fusion of multiple samples from multiple sensors, the samples are normalized to a pre-determined length.

After the samples are normalized, the normalized samples are output to the artificial neural network 606. As shown in FIG. 6 the artificial neural network 606 may include a feature extractor 608 and a classifier 610. The feature extractor 608 learns features from a consortium of sample behavioral data from multiple users of different devices. Furthermore, during a training phase, the feature learning is fine-tuned based on the normalized samples received from the pre-processing module 604. The consortium of sample behavioral data may be stored on the mobile device 600 in a memory 614 of the mobile device 600. During an authentication phase, the feature extractor 608 extracts features from the normalized samples and outputs the features to the classifier 610.

As previously discussed, during a training phase, the classifier 610 may be trained based on the normalized samples of the user of the mobile device 600 as well as the consortium of sample behavioral data from multiple users of different devices. Based on the training, the classifier 610 predicts the user and/or authenticates the user. Additionally, according to the authentication, an authentication module 612 may adjust the settings on the mobile device 600.

For example, if the user is authenticated, the authentication module 612 may allow continued access to the mobile device 600. Alternatively, if the user is not authenticated, the authentication module 612 may terminate a user's access until a subsequent authentication. Furthermore, if the user is not authenticated, the authentication module 612 may generate an alert to indicate that the mobile device 600 may have been stolen or compromised. In one configuration, if a user is authenticated with a confidence that is less than a full authentication threshold and greater than a non-authentication threshold, the authentication module 612 limits the use of the mobile device 600 to specific applications and/or actions. For example, the authentication module 612 may forget stored passwords and/or other personal information, such as stored credit card information.

In another example, the authentication module 612 may lock or unlock the mobile device 600 based on the authentication. In yet another example, the authentication module 612 may switch users on the mobile device 600 based on the predicted user and the authentication. In this example, if an authenticated user is a minor or child, the authentication module 612 may lock certain features and/or actions. For example, the authentication module 612 may prevent access to specific websites and/or the authentication module 612 may prevent incoming/outgoing calls to callers that are not on a pre-approved list.

Figure 7:
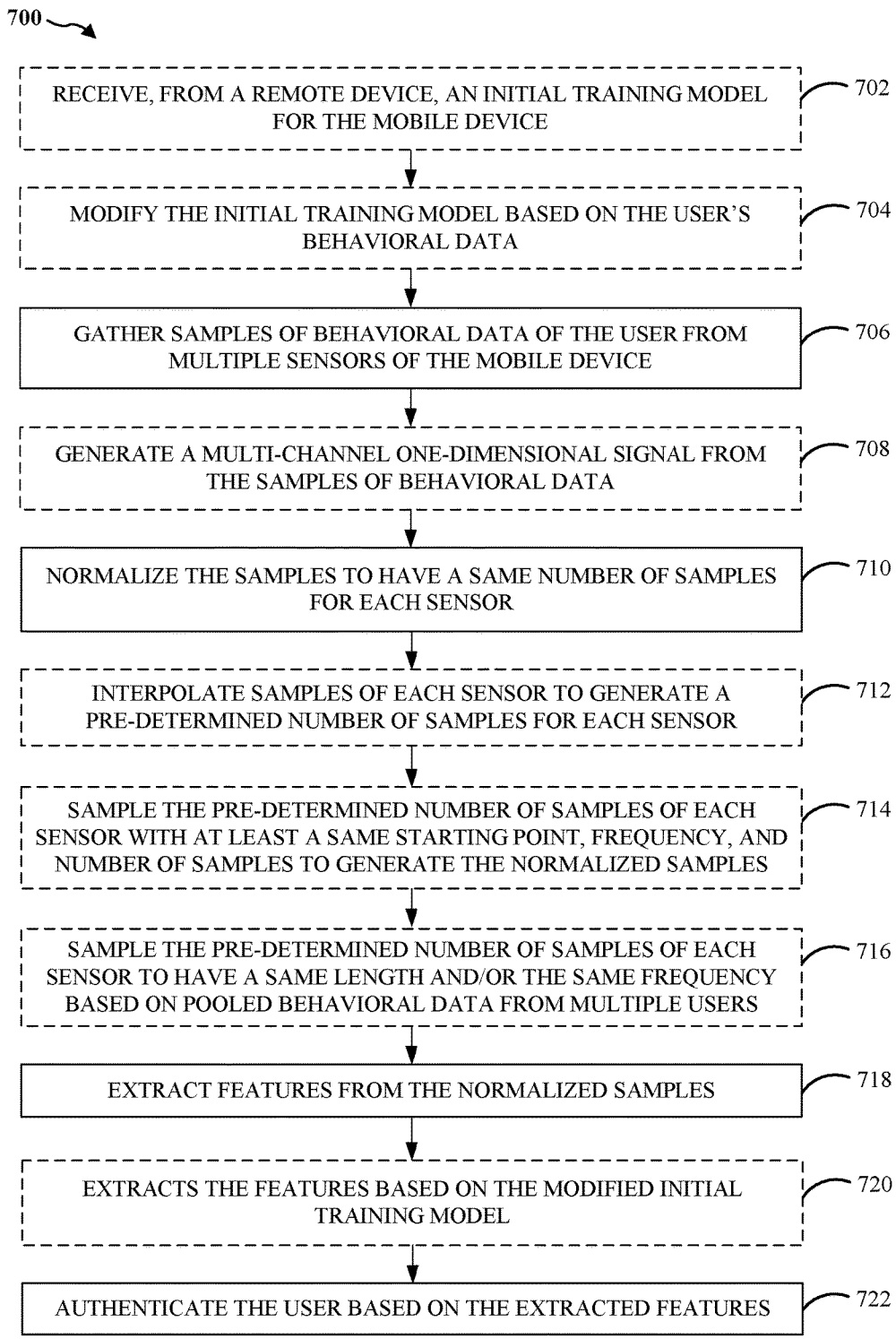
FIG. 7 illustrates a flow diagram for a method of authenticating a user on a mobile device according to aspects of the present disclosure.

FIG. 7 illustrates a method 700 for authenticating a user on a mobile device. In an optional configuration, at block 702, the mobile device receives, from a remote device, an initial training model for the mobile device. The initial training model is based on a consortium of behavioral data from multiple users. The initial training generates the initial training model for a specific device type, which includes a set of sensors that generate behavioral data. In another optional configuration, at block 704, the mobile device modifies the initial training model based on the user's behavioral data. In this configuration, the trained initial model is further fine-tuned to a specific user on the target device. The remote training may not be applied to a different device type as the difference in the sensor array is too large, and the deviation in the model will exceed a deviation threshold. According to aspects of the present disclosure, each device is trained on an initial model, which can later be fine-tuned to a specific user.

At block 706, the mobile device gathers samples of behavioral data of the user from multiple sensors of the mobile device. The sensors may include a touchscreen sensor, a background application sensor, a gyroscope, an accelerometer, and/or any other type of sensor used to collect user information and/or user gestures. Due to the type of sensor and/or the time of the gesture/action received at the sensor, each sensor may generate a different number of samples. That is, each sensor outputs a behavior signal and the signal sampling rate may differ, such that each signal has a different number of samples at different time points. Furthermore, different sensors may have a different number of samples during a same period of time. Additionally, the sensors may be time based samples. In one optional configuration, at block 708, the mobile device generates a multi-channel one-dimensional signal from the samples of behavioral data. Each channel may correspond to a different sensor. The multi-channel one-dimensional signal may be input to a pre-processor for normalizing the samples.

In block 710, the mobile device normalizes the samples to have a same number of samples for each sensor. In an optional configuration, at block 712, to normalize the samples, the mobile device interpolates samples of each sensor to generate a pre-determined number of samples for each sensor. That is, a behavior signal output from each sensor is interpolated from the samples of the behavior signal. The interpolation may generate additional samples by estimating a mathematical formulation of the signal.

Additionally, samples may be sub-sampled or discarded. For example, samples that have a sample size that is less than the pre-determined sample size may be interpolated to increase the sample size to the pre-determined sample size. Furthermore, samples that have a sample size that is greater than the pre-determined sample size may be discarded or sub-sampled to be equal to the pre-determined sample size.

In another optional configuration, at block 714, mobile device samples the pre-determined number of samples of each sensor with at least a same starting point, frequency, and number of samples to generate the normalized samples. The sampling at block 714 may be referred to as resampling. That is, after the samples of different (e.g., varying) frequencies are aligned by interpolation, the interpolated samples (e.g., signals) are resampled to generate normalized samples. The normalized samples may have the same length and/or frequency. The fixed length and/or frequency is pre-determined based on statistics of behavioral data pooled from multiple users. Additionally, or alternatively, the fixed length and/or frequency may be determined based on the resources available to the mobile device. The resources may refer to processing capacity and memory. The normalization may reduce the size of the neural network. In an optional configuration, at block 716, the mobile device samples the pre-determined number of samples of each sensor to have a same length and/or the same frequency based on pooled behavioral data from multiple users.

Furthermore, in block 718, the mobile device uses an artificial neural network, such as a convolutional neural network, to extract features from the normalized samples. In an optional configuration, at block 720, the mobile device extracts the features based on the modified initial training model. That is, a feature extractor may be trained using global user data. The global user data may be a consortium of sample behavioral data from various users. Furthermore, during a training phase, the learning may be fine-tuned (e.g., modified) based on samples from the one or more users of the mobile device. The learning may be performed on the device or on a remote device.

Additionally, at block 722, the mobile device authenticates the user based on the extracted features. The authentication may predict the user and authenticate the user. Based on the level of authentication, various features (e.g., applications) and/or actions of the mobile device may be locked or unlocked.

In some aspects, method 700 may be performed by the SOC 100 (FIG. 1), the system 200 (FIG. 2), or the mobile device 600 (FIG. 6). That is, each of the elements of method 700 may, for example, but without limitation, be performed by the SOC 100, the system 200, the mobile device 600 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of authenticating a user on a mobile device, comprising:
   receiving, at the mobile device from a remote device, a pre-trained convolutional neural network previously trained with behavioral data from a first plurality of remote users;
   updating, at the mobile device, the pre-trained convolutional neural network based on behavioral data of the user gathered from a plurality of sensors of the mobile device during a first period of time to generate an updated convolutional neural network;
   gathering, at the mobile device, samples of the behavioral data of the user from the plurality of sensors of the mobile device during a second period of time, each sensor generating a different number of samples during the second period of time;
   normalizing, at the mobile device, the samples to obtain a same number of samples for each sensor during the period of time;
   extracting, at the mobile device with the updated convolutional neural network, features from the normalized samples; and
   authenticating, at the mobile device, the user based on the extracted features.

2. The method of claim 1, in which the normalizing further comprises:
   interpolating samples of each sensor to generate a pre-determined number of samples for each sensor; and
   sampling the pre-determined number of samples of each sensor with at least a same starting point, a same frequency, and the same number of samples to generate the normalized samples.

3. The method of claim 2, further comprising sampling the pre-determined number of samples of each sensor to have a same length and the same frequency based on a distribution of samples obtained from pooled behavioral data from a plurality of users.

4. The method of claim 1, in which:
   the samples are time based;
   the samples have different lengths for different gestures at one sensor; and
   the samples have different lengths across different sensors.

5. The method of claim 1, further comprising generating a multi-channel one-dimensional signal from the samples, each channel corresponding to a different sensor.

6. A mobile device for authenticating a user based on behavioral data of the user, comprising:
   a memory; and
   at least one processor coupled to the memory, the at least one processor configured:
      to receive, from a remote device, a pre-trained convolutional neural network previously trained with behavioral data from a first plurality of remote users;
      to update the pre-trained convolutional neural network based on behavioral data of the user gathered from a plurality of sensors of the mobile device during a first period of time to generate an updated convolutional neural network;
      to gather samples of the behavioral data of the user from the plurality of sensors of the mobile device during a second time period, each sensor generating a different number of samples during the second period of time;
      to normalize the samples to have a same number of samples for each sensor during the period of time;
      to extract, with the updated convolutional neural network, features from the normalized samples; and
      to authenticate the user based on the extracted features.

7. The mobile device of claim 6, in which the at least one processor is further configured to normalize by:
   interpolating samples of each sensor to generate a pre-determined number of samples for each sensor; and
   sampling the pre-determined number of samples of each sensor with at least a same starting point, a same frequency, and the same number of samples to generate the normalized samples.

8. The mobile device of claim 7, in which the at least one processor is further configured to sample the pre-determined number of samples of each sensor to have a same length and the same frequency based on a distribution of samples obtained from pooled behavioral data from a plurality of users.

9. The mobile device of claim 6, in which:
   the samples are time based;
   the samples have different lengths for different gestures at one sensor; and
   the samples have different lengths across different sensors.

10. The mobile device of claim 6, in which the at least one processor is further configured to generate a multi-channel one-dimensional signal from the samples, each channel corresponding to a different sensor.

11. An apparatus for authenticating a user based on behavioral data of the user, comprising:
   means for receiving, at the apparatus from a remote device, a pre-trained convolutional neural network previously trained with behavioral data from a first plurality of remote users;
   means for updating, at the apparatus, the pre-trained convolutional neural network based on behavioral data of the user gathered from a plurality of sensors of the mobile device during a first period of time to generate an updated convolutional neural network;

means for gathering, at the apparatus, samples of the behavioral data of the user from the plurality of sensors of the apparatus during a second period of time, each sensor generating a different number of samples during the second period of time;

means for normalizing, at the apparatus, the samples to have a same number of samples for each sensor during the period of time;

means for extracting, at the apparatus with the updated convolutional neural network, features from the normalized samples; and means for authenticating, at the apparatus, the user based on the extracted features.

12. The apparatus of claim 11, in which the means for normalizing further comprises:

means for interpolating samples of each sensor to generate a pre-determined number of samples for each sensor; and means for sampling the pre-determined number of samples of each sensor with at least a same starting point, a same frequency, and the same number of samples to generate the normalized samples.

13. The apparatus of claim 12, further comprising means for sampling the pre-determined number of samples of each sensor to have a same length and the same frequency based on a distribution of samples obtained from pooled behavioral data from a plurality of users.

14. The apparatus of claim 11, in which:

the samples are time based, the samples have different lengths for different gestures at one sensor, and the samples have different lengths across different sensors.

15. The apparatus of claim 11, further comprising means for generating a multi-channel one-dimensional signal from the samples, each channel corresponding to a different sensor.

* * * * *